(12) United States Patent
Bhandari et al.

(10) Patent No.: US 12,641,183 B2
(45) Date of Patent: May 26, 2026

(54) PROVISIONING FRAMEWORK SUPPORTING PLURAL DIFFERENT NETWORKS

(71) Applicant: Cisco Technology, Inc., San Jose, CA (US)

(72) Inventors: Nitin Bhandari, Cumming, GA (US); Abhishek Mukherjee, Suwanee, GA (US); Megha Mahale, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 406 days.

(21) Appl. No.: 18/326,289

(22) Filed: May 31, 2023

(65) Prior Publication Data

US 2024/0323284 A1 Sep. 26, 2024

Related U.S. Application Data

(60) Provisional application No. 63/453,328, filed on Mar. 20, 2023.

(51) Int. Cl.
*H04M 15/00* (2006.01)
*G06Q 30/04* (2012.01)

(52) U.S. Cl.
CPC ............ *H04M 15/55* (2013.01); *G06Q 30/04* (2013.01); *H04M 15/41* (2013.01)

(58) Field of Classification Search
CPC .............................. H04M 15/55; H04M 15/41
See application file for complete search history.

(56) References Cited

U.S. PATENT DOCUMENTS

| | | | | |
|---|---|---|---|---|
| 2012/0317261 A1* | 12/2012 | Ahmavaara | ........... | H04L 67/141 |
| | | | | 709/223 |
| 2016/0036779 A1 | 2/2016 | Collins et al. | | |
| 2022/0006692 A1 | 1/2022 | Viswanathan et al. | | |
| 2022/0086045 A1 | 3/2022 | Saarnivala et al. | | |
| 2022/0150325 A1* | 5/2022 | Rahn | .................. | G06Q 30/0637 |
| 2022/0191279 A1 | 6/2022 | Zhang | | |
| 2022/0255944 A1 | 8/2022 | Chan et al. | | |

OTHER PUBLICATIONS

Nokia, "Smart Agriculture as a Service for a sustainable future," retrieved from https://onestore.nokia.com/asset/207689?_ga=2. 180014444.976936098.1676226367-1933556154.1676226367, May 31, 2023, 9 pages.
Ericsson IoT Accelerator, "Cloud-based connectivity management platform for a global IoT market," retrieved from https://www. ericsson.com/492813/assets/global/eridoc/601345/5-28701-FGC1011361UEN.pdf, Mar. 2022, 7 pages.

* cited by examiner

*Primary Examiner* — Myron Wyche
(74) *Attorney, Agent, or Firm* — Edell, Shapiro & Finnan, LLC

(57) ABSTRACT

One or more processors of a device management platform map network identifiers to corresponding networks. An account of the device management platform manages devices on a plurality of networks based on the network identifiers. The one or more processors of the device management platform identify a network of a device associated with the account from the plurality of networks based on a mapping of a network identifier of the device to the network. The one or more processors of the device management platform perform an action for the device with respect to the network.

20 Claims, 7 Drawing Sheets

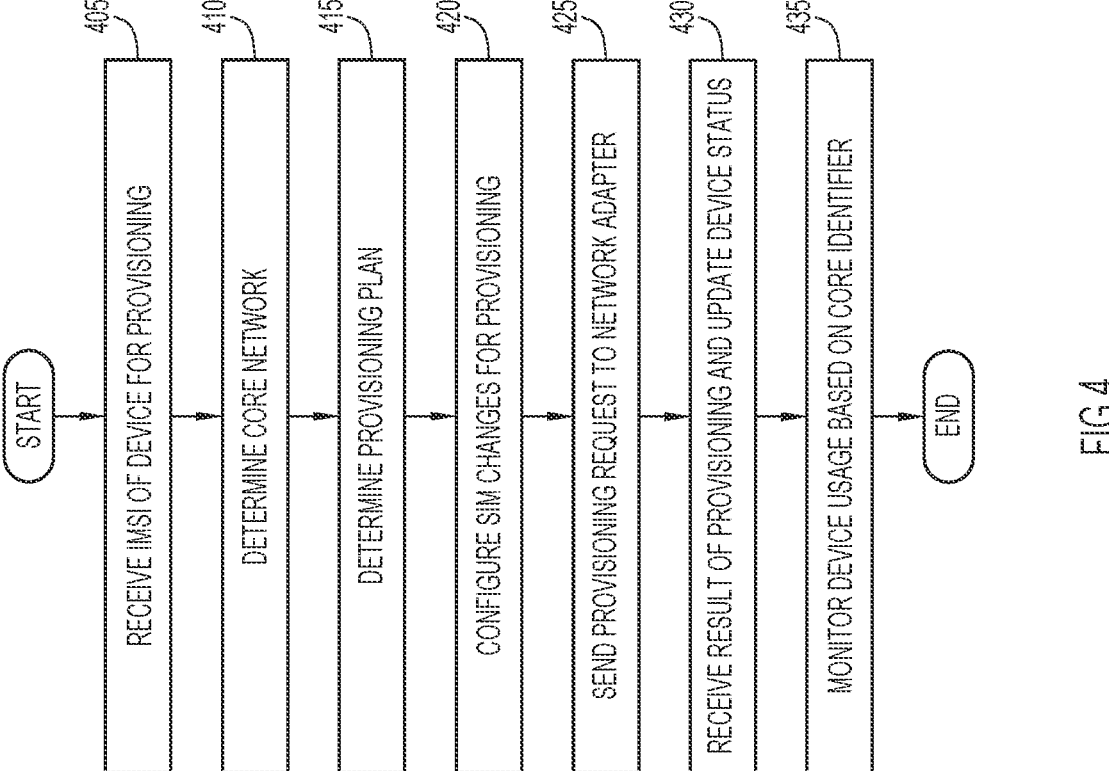
START
405 — RECEIVE IMSI OF DEVICE FOR PROVISIONING
410 — DETERMINE CORE NETWORK
415 — DETERMINE PROVISIONING PLAN
420 — CONFIGURE SIM CHANGES FOR PROVISIONING
425 — SEND PROVISIONING REQUEST TO NETWORK ADAPTER
430 — RECEIVE RESULT OF PROVISIONING AND UPDATE DEVICE STATUS
435 — MONITOR DEVICE USAGE BASED ON CORE IDENTIFIER
END
400
FIG.4

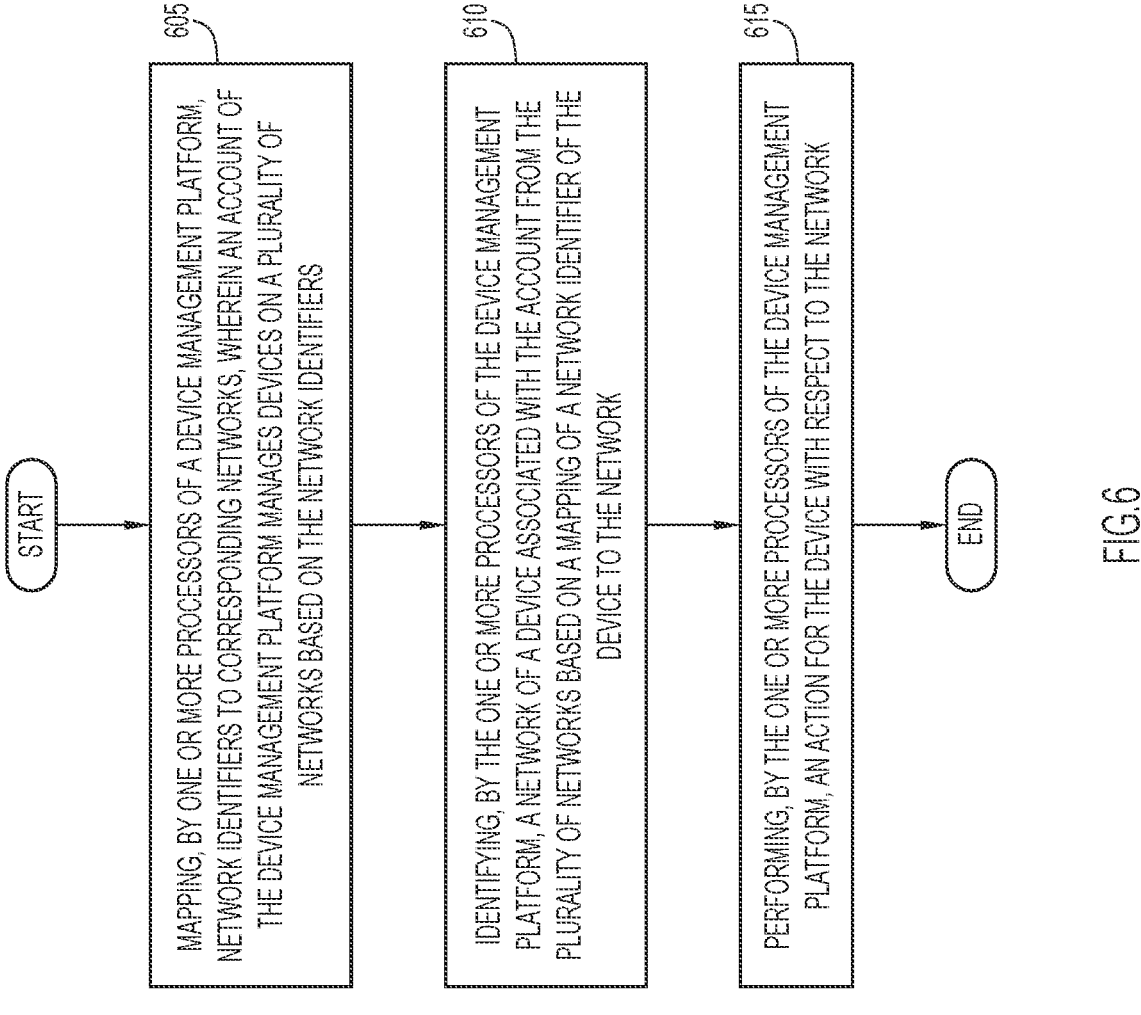

START

605

MAPPING, BY ONE OR MORE PROCESSORS OF A DEVICE MANAGEMENT PLATFORM, NETWORK IDENTIFIERS TO CORRESPONDING NETWORKS, WHEREIN AN ACCOUNT OF THE DEVICE MANAGEMENT PLATFORM MANAGES DEVICES ON A PLURALITY OF NETWORKS BASED ON THE NETWORK IDENTIFIERS

610

IDENTIFYING, BY THE ONE OR MORE PROCESSORS OF THE DEVICE MANAGEMENT PLATFORM, A NETWORK OF A DEVICE ASSOCIATED WITH THE ACCOUNT FROM THE PLURALITY OF NETWORKS BASED ON A MAPPING OF A NETWORK IDENTIFIER OF THE DEVICE TO THE NETWORK

615

PERFORMING, BY THE ONE OR MORE PROCESSORS OF THE DEVICE MANAGEMENT PLATFORM, AN ACTION FOR THE DEVICE WITH RESPECT TO THE NETWORK

END

PROVISIONING FRAMEWORK SUPPORTING PLURAL DIFFERENT NETWORKS

CROSS-REFERENCE TO RELATED APPLICATION

This application claims priority to U.S. Provisional Patent Application Ser. No. 63/453,328, entitled "Unified Dual Core Provisioning Framework to Support 4G and 5G Networks" and filed on Mar. 20, 2023, the entirety of which is incorporated herein by reference.

TECHNICAL FIELD

The present disclosure relates to communication networking.

BACKGROUND

Cloud solutions, such as a control center, help customers manage devices and associated services. A control center receives real-time information about device connectivity and usage from various network integration points, such as a charging function (CHF), charging gateway (CHG), etc. The control center provides self-service functionality to Internet Of Things (IoT) customers, including common application programming interfaces (APIs), predefined reports for both internal and customer use, and flexible rating for IoT customers on a hosted core network (e.g., connected car, industrials, etc.).

With the introduction of 5G Stand Alone (5G-SA), a control center is required to support an existing hosted long-term evolution (LTE) (4G) core network as well as a partner service provider (SP) 5G core network from the same control center account seamlessly. However, the control center has hard integration/coupling with the packet and device management core network. In other words, a service provider instance is integrated/coupled with a single core network. Accordingly, two disjoint/independent core networks cannot be managed from the same control center service provider instance or account.

Establishing a new physical control center instance is expensive as it requires data center space, extensive servers/hardware, and power requirements. In case a new network integration is required, a new physical control center instance or a new logical service provider (SP) instance is required.

BRIEF DESCRIPTION OF THE DRAWINGS

FIG. 4 illustrates a flowchart of a method of a device management platform instance provisioning a device among a plurality of integrated networks, according to an example embodiment.

FIG. 6 illustrates a flowchart of a generalized method for integrating different networks into a device management platform instance, according to an example embodiment

DETAILED DESCRIPTION

Overview

In an embodiment, one or more processors of a device management platform map network identifiers to corresponding networks. An account of the device management platform manages devices on a plurality of networks based on the network identifiers. The one or more processors of the device management platform identify a network of a device associated with the account from the plurality of networks based on a mapping of a network identifier of the device to the network. The one or more processors of the device management platform perform an action for the device with respect to the network.

Example Embodiments

In an embodiment, techniques are provided for global enterprises or other organizations to manage assets in geographically distributed locations integrated and operated by different service providers. A core or network identifier allows enterprises or other organizations to seamlessly manage devices/endpoints using a single platform instance with a single pane-of-glass view. The techniques provide a single provisioning interface, real-time troubleshooting of devices deployed globally, live device tracking, charging data records (CDRs), and network feed for centralized monitoring, billing, and rating.

Example embodiments provide a single pane-of-glass view (or user interface) to enterprises or other organizations to allow them to manage Internet of Things (IoT) devices across different core networks seamlessly. Functionality and business flow (e.g., application programming interfaces (APIs), subscriber management, provisioning, billing, network integration, troubleshooting, diagnostic, spotlight swimlanes, user equipment (UE) past data, etc.) of a device management platform instance are integrated with disjoint core networks having independent integrations. The operator or enterprise does not see or is not required to change any of the existing workflows which are live and supported with a single hosted core network.

Figure 1:
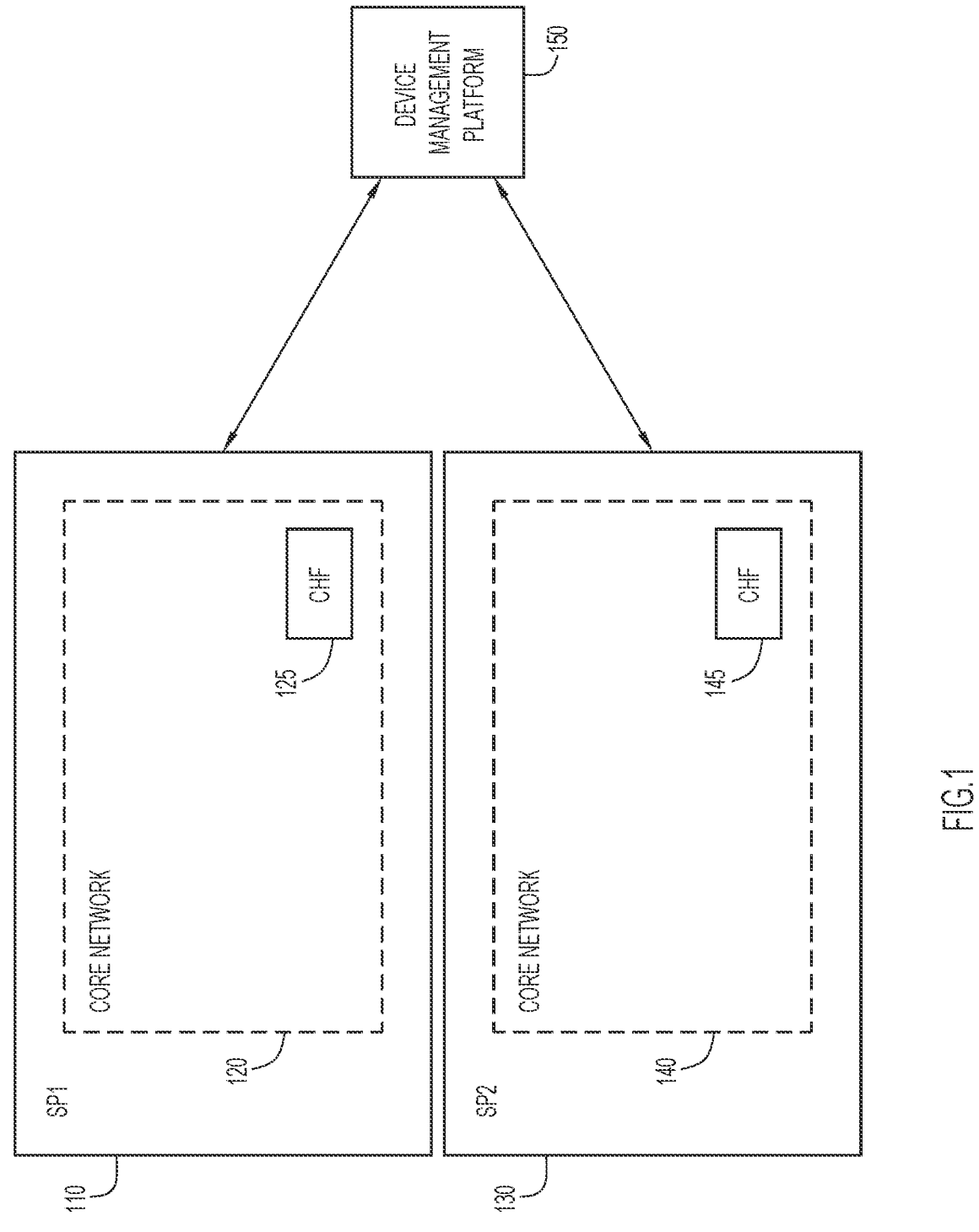
FIG. 1 illustrates networks integrated into a device management platform instance, according to an example embodiment.

FIG. 1 illustrates a network environment 100 depicting plural service providers integrating with a device management platform instance, according to an example embodiment. By way of example, the embodiments are described with respect to service providers (SPs) and enterprises. However, the embodiments may be utilized with respect to any other entities, any type of information from networks, and any type of actions.

Network environment 100 includes a device management platform 150 to communicate with, and manage devices of, one or more service provider networks. The device management platform is preferably a cloud-based platform. By way of example, device management platform 150 may manage devices of service providers 110 (e.g., SP1 as viewed in FIG. 1) and 130 (SP2 as viewed in FIG. 1) from a single instance or account. Service provider 110 may include, or be associated with, a core network 120 (e.g., 5G, LTE (4G), hybrid core (4G and 5G), etc.) that services devices (e.g., user devices, Internet of Things (IoT) devices, etc.) of one or more enterprises. Core network 120 processes connectivity requests to authenticate and validate the devices for network connectivity. Further, core network 120 includes a charging function 125 that provides billing, charging, and/or rating processing for network device usage to device management platform 150.

Service provider 130 may include, or be associated with, a core network 140 (e.g., 5G, LTE (4G), hybrid core (4G and 5G), etc.) that services devices (e.g., user devices, Internet of Things (IoT) devices, etc.) of one or more enterprises. Core network 140 processes connectivity requests to authenticate and validate the devices for network connectivity. Further, core network 140 includes a charging function 145 that provides billing, charging, and/or rating processing for network device usage to device management platform 150.

Core networks 120 and 140 provide information to device management platform 150 for management of corresponding devices utilizing network services. However, the service providers may provide service to any quantity or types of enterprises in any desired arrangement. The service providers may refer to carriers providing network services, while the enterprises may be companies or other organizations using the network services provided by the service providers. Accordingly, embodiments enable the carriers and/or organizations to manage devices across different networks from a common account or instance of device management platform 150. The device management may include various actions (e.g., activating a device on a network, deactivating a device on a network, updating a profile (e.g., network services, plans, user/device information, etc.) for a network, etc.).

Figure 2:
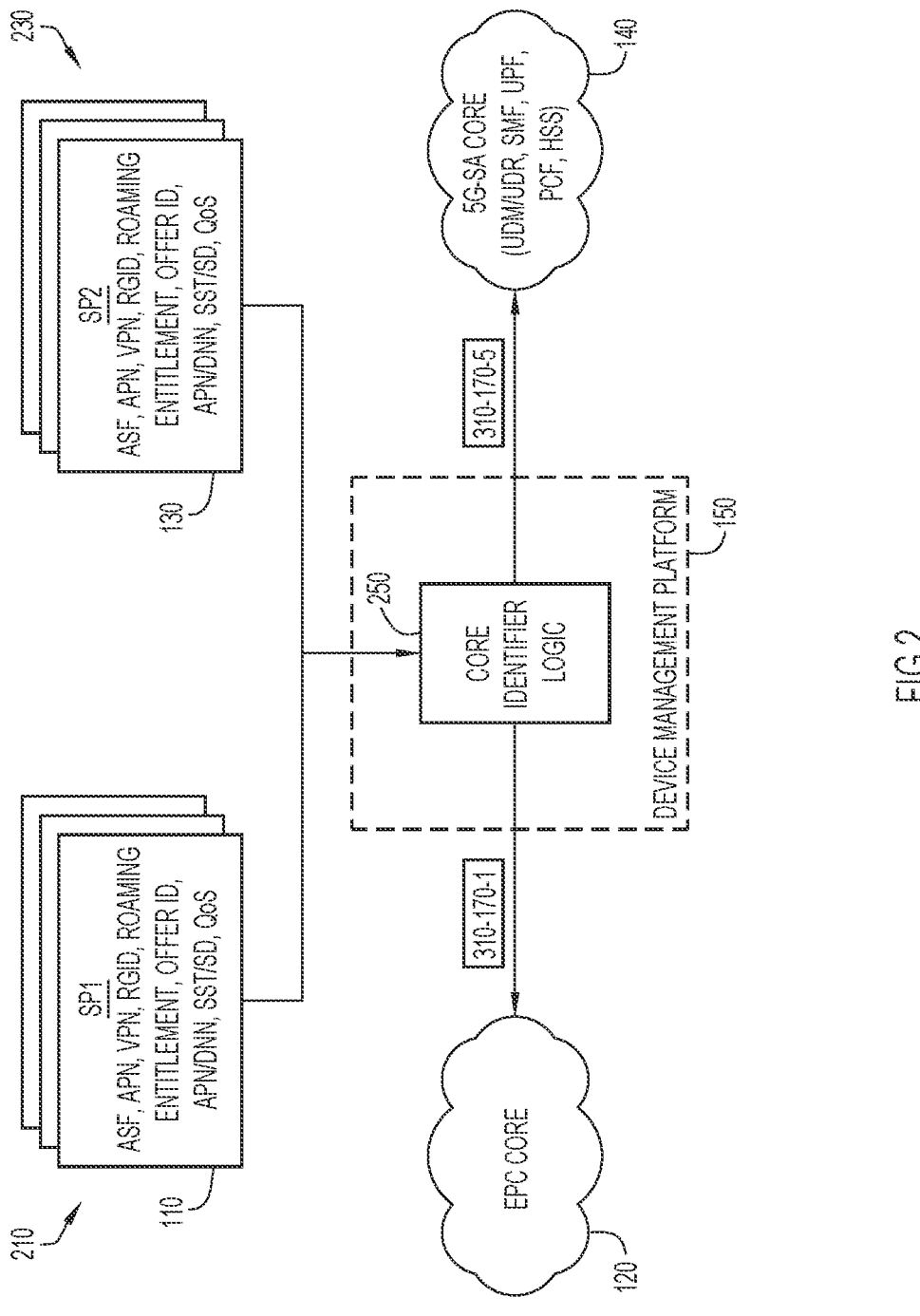
FIG. 2 illustrates a system configured for integration of different networks with a device management platform instance, according to an example embodiment.

With continued reference to FIG. 1, FIG. 2 illustrates a system configured for integration of different networks for an instance of device management platform 150, according to an example embodiment. By way of example, FIG. 2 is described with respect to service providers (SPs) and enterprises. However, the embodiments may be utilized with respect to any other entities, any type of information from networks, and any type of actions.

Initially, device management platform 150 communicates with service providers 110, 130 and their corresponding core networks 120, 140. By way of example, core network 120 may be an evolved packet core (EPC) network (e.g., providing voice and data on a 4G long-term evolution (LTE) network), while core network 140 may be a 5G Stand Alone (5G-SA) network. Service providers 110, 130 may provide various network services or functionality. For example, service provider 110 (e.g., SP1 as viewed in FIG. 2) and service provider 130 (e.g., SP2 as viewed in FIG. 2) may provide network services or functionality, including alert standard format (ASF), access point name (APN), virtual private network (VPN), RGID, roaming entitlement, offer ID, access point name (APN)/data network name (DNN), slice service/type (SST)/slice differentiator (SD), quality of service (QOS), etc. Service provider 110 may be associated with a service provider instance or account 210 of the device management platform to monitor and track the network services and functionality, while service provider 130 may be associated with service provider instance or account 230.

Service provider instances 210, 230 each enable the respective service providers to monitor and track device usage across different networks 120, 140 from the same service provider instance or account. By way of example, service provider 110 may desire to host users with 5G service on its core network 140 (5G network) and other users with 4G service on core network 120. Service provider 130 may similarly desire to host users on different networks 120, 140. In order to accommodate provisioning of devices on the different core networks from a same service provider instance or account on device management platform 150, the device management platform includes core identifier logic 250. The core identifier logic employs an extensible technique that utilizes a core or network identifier to distinguish between networks. This identifier may use sub-ranges of an international mobile subscriber identity (IMSI) of devices to identify individual networks managed by different operators in their infrastructure. In other words, the IMSI sub-ranges correspond to and are used to indicate different networks.

By way of example, core identifiers for core network 120 may include 901-16 and 310-170-1 (e.g., as viewed in FIG. 2), while core identifiers for core network 140 may include 310-170-5 (e.g., as viewed in FIG. 2), and 310-170-6 based on IMSI sub-ranges. The sub-ranges for the core identifier may be determined based on IMSI prefixes. However, the core identifier can be extended to use a device ID, Internet Protocol (IP) address range, etc. to help enterprises manage device provisioning, charging data record (CDR) inflow, rating, and troubleshooting.

Device management platform 150 preferably resides in a managed cloud, while core identifier logic 250 resides in a core of the device management platform framework. Core identifier logic 250 is applied to individual subscriber identity module (SIM)/international mobile subscriber identity (IMSI) based on which of both north and south bound flows are analyzed/handled.

Core identifier logic 250 provides several advantages. For example, onboarding two or more disjoint networks managed by different service providers may be performed from device management platform 150 using a core identifier for a given enterprise. The framework is not limited to supporting two disjoint networks, but can support any quantity of independent networks across the globe managed by different service providers (SPs). In other words, the framework is scalable, where new networks may be added by incorporating additional core identifiers (e.g., IMSI sub-ranges, etc.) for the new networks. Once a device is provisioned on a network, the core identifier is used within data traffic to monitor and determine network usage of the device. In addition, the core identifier enables a service provider or enterprise to monitor and track usage of their devices across different networks from a single instance or account of the device management platform 150.

By way of example, an enterprise may offer security, safety, and infotainment services in a vehicle (e.g., car, truck, van, motorcycle, boat, etc.). The enterprise operates in different countries and is affiliated with several different service providers (SPs) to offer services to consumers. Example embodiments help enterprises (e.g., in the connected car space, etc.) to have one platform globally providing business and operations support system (OSS/BSS) capabilities without concern for underlying network integration complexities. The enterprise has a unified device management platform interface and may manage vehicles across different geographies and networks (e.g., USA; Canada; South America; Asia Pacific, Japan and China (APJC); etc.). The core identifiers allow the steering of provisioning, charging data records (CDRs) (for rating and billing), and network feeds from network functions (e.g., home subscriber server (HSS), unified data management (UDM)/unified data repository (UDR), short message service center (SMSC), etc.). These network feeds allow the enterprise to view real-time device activity and usage, build security alerts and notifications for data overage, and troubleshoot devices by forcing re-registration.

In addition, the core identifier allows enterprises to establish customized rate plans and monetize independently for each market/country. Enterprises can save on capital expenditures/costs by obviating the need to establish a new device management platform instance or account and additional head counts to manage the new instance or account.

Figure 3:
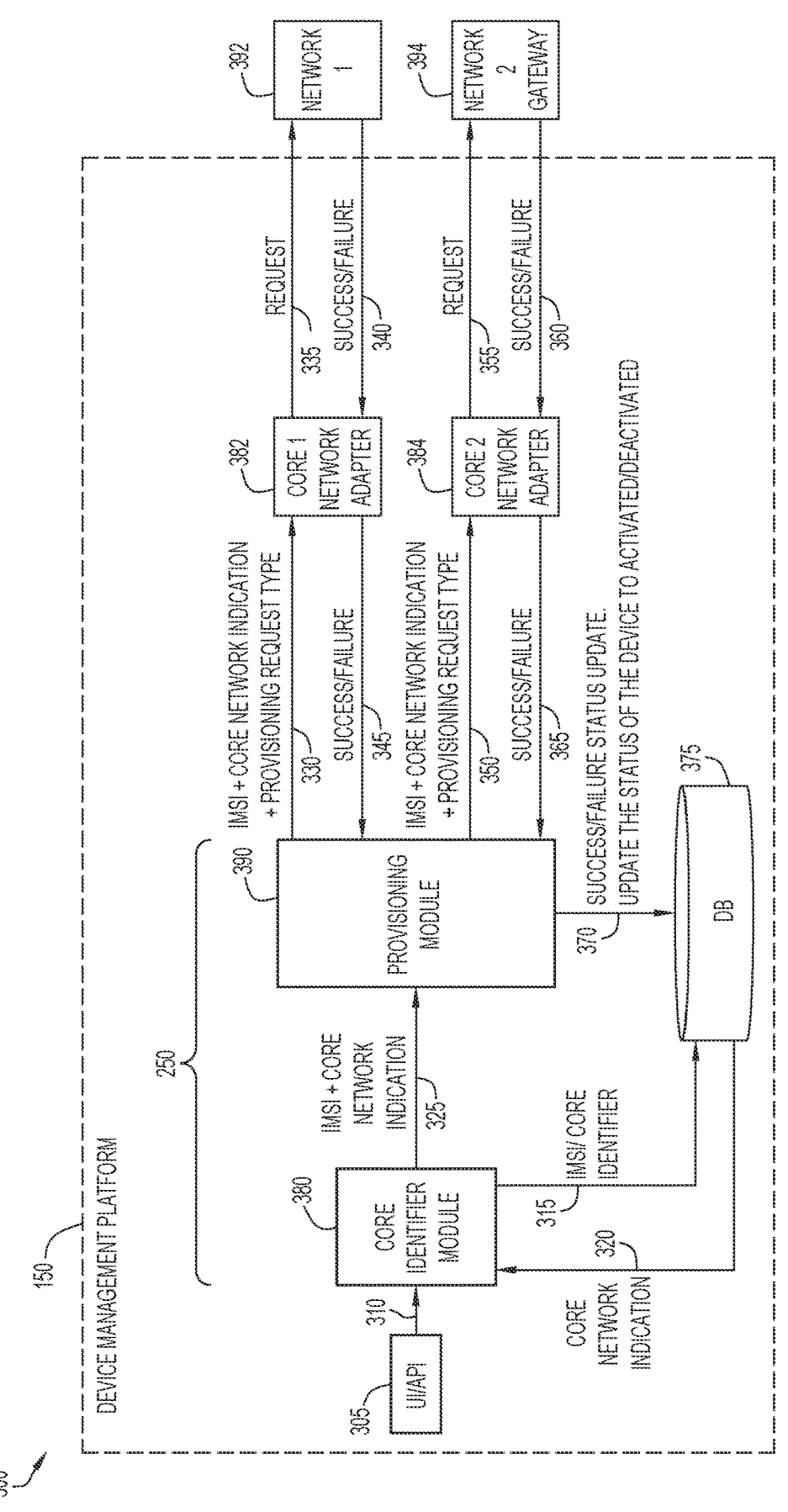
FIG. 3 illustrates a flow diagram of a method for provisioning a device from a device management platform instance integrating different networks, according to an example embodiment.

With continued reference to FIGS. 1 and 2, FIG. 3 illustrates a flow diagram of a method 300 of provisioning a device from a device management platform instance integrating different networks, according to an example embodiment. By way of example, FIG. 3 is described with respect to service providers (SPs) and enterprises. However, the embodiments may be utilized with respect to any other entities, any type of information from networks, and any type of actions.

Initially, device management platform 150 maps core or network identifiers to core networks by storing mappings between core identifiers and corresponding core networks in database (DB) 375. The core identifier may be an international mobile subscriber identity (IMSI) prefix. However, any portion or the entirety of the IMSI or other identifier may be used as a core identifier. A request for device management platform 150 may be received from a user interface or application programming interface (API) 305 at operation 310. The request may be made from, or provided to, an instance or account of device management platform 150 for a service provider or other entity. For example, the service provider or other entity may provide a request to provision a device on one of a plurality of different networks integrated with the instance or account. The instance or account on the device management platform maintains a list of devices associated with the account (and service provider or other entity) and corresponding device information.

The request may include an identifier for a corresponding device (e.g., international mobile subscriber identity (IMSI), etc.) and an action to be performed on a network for the corresponding device (e.g., activation of the device on a network, deactivation of the device on a network, update a profile for the device (e.g., services, plan, etc.), etc.). The device may be associated with a new subscriber identity module (SIM) to be provisioned (e.g., activated, etc.) on a network (e.g., from a manufacturer, etc.), or to an existing SIM for updates for the device on the network (e.g., activate, deactivate, update a profile, etc.). The SIM typically stores the ISMI and other information for device authentication and network operation. Core identifier logic 250 includes a core identifier module 380 and a provisioning module 390. Core identifier module 380 determines the core identifier from the prefix of the IMSI in the request, and queries database 375 based on the core identifier at operation 315. Database 375 determines a core network associated with the core identifier from the mappings stored in the database, and provides an indication of the core network to core identifier module 380 at operation 320. The core network indication may include any indication or identifier indicating the core network (e.g., name, code, network identifier, network identification, network address, etc.). The core identifier module sends the request (including IMSI) and the core network indication to provisioning module 390 at operation 325.

Provisioning module 390 identifies a type of provisioning that needs to be executed for each device/subscriber identity module (SIM) of the request (e.g., activation of the device, deactivation of the device, update a profile (e.g., service, plan, etc.), etc.). The provisioning module forwards a provisioning request to the corresponding core network via a network adapter, and updates database 375 with the result of the provisioning received from the corresponding core network. For example, provisioning module 390 may determine that the core network indication identifies a network 392 (e.g., Network 1 as viewed in FIG. 3), and sends the international mobile subscriber identity (IMSI), core network indication, and type of provisioning to a core network adapter 382 associated with network 392 at operation 330. Core network adapter 382 has information including the Internet Protocol (IP) address of the corresponding network element of network 392 (e.g., via home location register (HLR)/home subscriber server (HSS), etc.), and prepares a provisioning request payload. Core network adapter 382 requests network 392 to perform the provisioning at operation 335 (e.g., sends the provisioning request and payload to the network IP address, etc.), and receives results of the provisioning (e.g., success or failure, etc.) from network 392 at operation 340. Core network adapter 382 provides the result to provisioning module 390 at operation 345. The provisioning module updates a status of the device based on the result of the provisioning in database 375 (e.g., update a device status to activated or deactivated, etc.) at operation 370.

By way of further example, provisioning module 390 may determine that the core network indication identifies a network having a gateway 394 (e.g., Network 2 gateway as viewed in FIG. 3), and sends the international mobile subscriber identity (IMSI), core network indication, and type of provisioning to a core network adapter 384 associated with network gateway 394 at operation 350. Core network adapter 384 has information including the Internet Protocol (IP) address of the corresponding network element or network gateway 394 (e.g., via home location register (HLR)/home subscriber server (HSS), etc.), and prepares a provisioning request payload. Core network adapter 384 requests network gateway 394 to perform the provisioning at operation 355 (e.g., sends the provisioning request and payload to the network gateway IP address, etc.), and receives results of the provisioning (e.g., success or failure, etc.) from network gateway 394 at operation 360. Core network adapter 384 provides the result to provisioning module 390 at operation 365. The provisioning module updates a status of the device based on the result of the provisioning in database 375 (e.g., update a device status to activated or deactivated, etc.) at operation 370.

Accordingly, an instance or account of device management platform 150 enables a service provider or other entity to provision a device on any of a plurality of different networks. Moreover, once a device is provisioned on a network, the core identifier (and a device identifier) reside within data traffic associated with the device, and may be used to monitor and track usage of the device on the network. A service provider or other entity may view the usage for their devices across different networks from the same instance or account of the device management platform.

With continued reference to FIGS. 1-3, FIG. 4 illustrates a flowchart of a method 400 of a device management platform instance provisioning a device among a plurality of integrated networks, according to an example embodiment. By way of example, FIG. 4 is described with respect to service providers (SPs) and enterprises. However, the embodiments may be utilized with respect to any other entities, any type of information from networks, and any type of actions.

A request is received by device management platform 150 at operation 405. The request may be received from a user interface or application programming interface (API). The request may be made from, or provided to, an instance or account of the device management platform for a service provider or other entity. For example, the service provider or other entity may provide a request to provision a device on one of a plurality of different networks integrated with the instance or account. The instance or account on the device management platform maintains a list of devices associated with the account (and service provider or other entity) and corresponding device information.

The request includes an identifier for a corresponding device (e.g., international mobile subscriber identity (IMSI), etc.) and an action to be performed on a network for the corresponding device (e.g., activation of the device on a network, deactivation of the device on a network, update a profile for the device (e.g., services, plan, etc.), etc.). The device may be associated with a new subscriber identity module (SIM) to be provisioned (e.g., activated, etc.) on a network (e.g., from a manufacturer, etc.), or to an existing SIM for updates for the device on the network (e.g., activate, deactivate, update a profile, etc.).

Device management platform 150 determines the core identifier from the prefix of the IMSI in the request, and queries database 375 based on the core identifier to retrieve an indication of a core network for the device at operation 410 in substantially the same manner described above. The core network indication may include any indication or identifier indicating the core network (e.g., name, code, network identifier, network identification, network address, etc.).

Device management platform 150 determines a provisioning plan or strategy to perform the requested provisioning at operation 415 based on the core network indication. The provisioning plan may include the type of provisioning, the operations to be performed (e.g., subscriber identity module (SIM) changes, etc.), and/or the core network. The device management platform stores a series of provisioning plans that are associated with corresponding core networks. A provisioning plan is selected from among the stored plans based on the core network indicated for the device.

The operations (e.g., subscriber identity module (SIM) changes, etc.) of the selected provisioning plan are configured and scheduled at operation 420. For example, various SIM change objects (e.g., for a state change, profile change, MSISDN change, etc.) may be created, and the SIM changes may be initiated by a SIM change framework.

Device management platform 150 forwards a provisioning request to a network adapter corresponding to the indicated core network at operation 425. The network adapter provides the request to the corresponding core network (or network element), and receives a result (e.g., success or failure, etc.) of the provisioning at operation 430. The device management platform updates a database with the result of the provisioning for the device received from the corresponding network adapter.

Once a new device has been provisioned on the core network or an existing device updated, device management platform 150 monitors and tracks usage of the device based on the core identifier at operation 435. In an embodiment, the core identifier (and a device identifier) are used within network or other data traffic. This enables the device management platform to identify the network and device in order to steer the data traffic to a network, or process the data traffic for the device. The device may be mapped to a device management platform instance or account, where the device management platform may process data for the device for presentation via the instance or account. For example, the instance or account of the device management platform may provide real-time troubleshooting of the device, live device tracking, charging data records (CDRs), centralized monitoring, billing, and rating, etc. This enables a service provider or other entity to monitor and track usage of their devices across different networks from a single instance or account of the device management platform.

In an embodiment, device management platform 150 may monitor devices in real-time, thereby enabling detection of anomalies and reporting of data as events occur. For example, the device management platform instances may utilize the usage data to detect anomalies or abnormal device operation. When an anomaly is detected for a device, the device management platform instance may perform various actions to remediate the anomaly in device operation (e.g., send notifications to the service providers and/or enterprises, disable the device, disable connectivity of the device or remove the device from the network, etc.).

Figure 5:
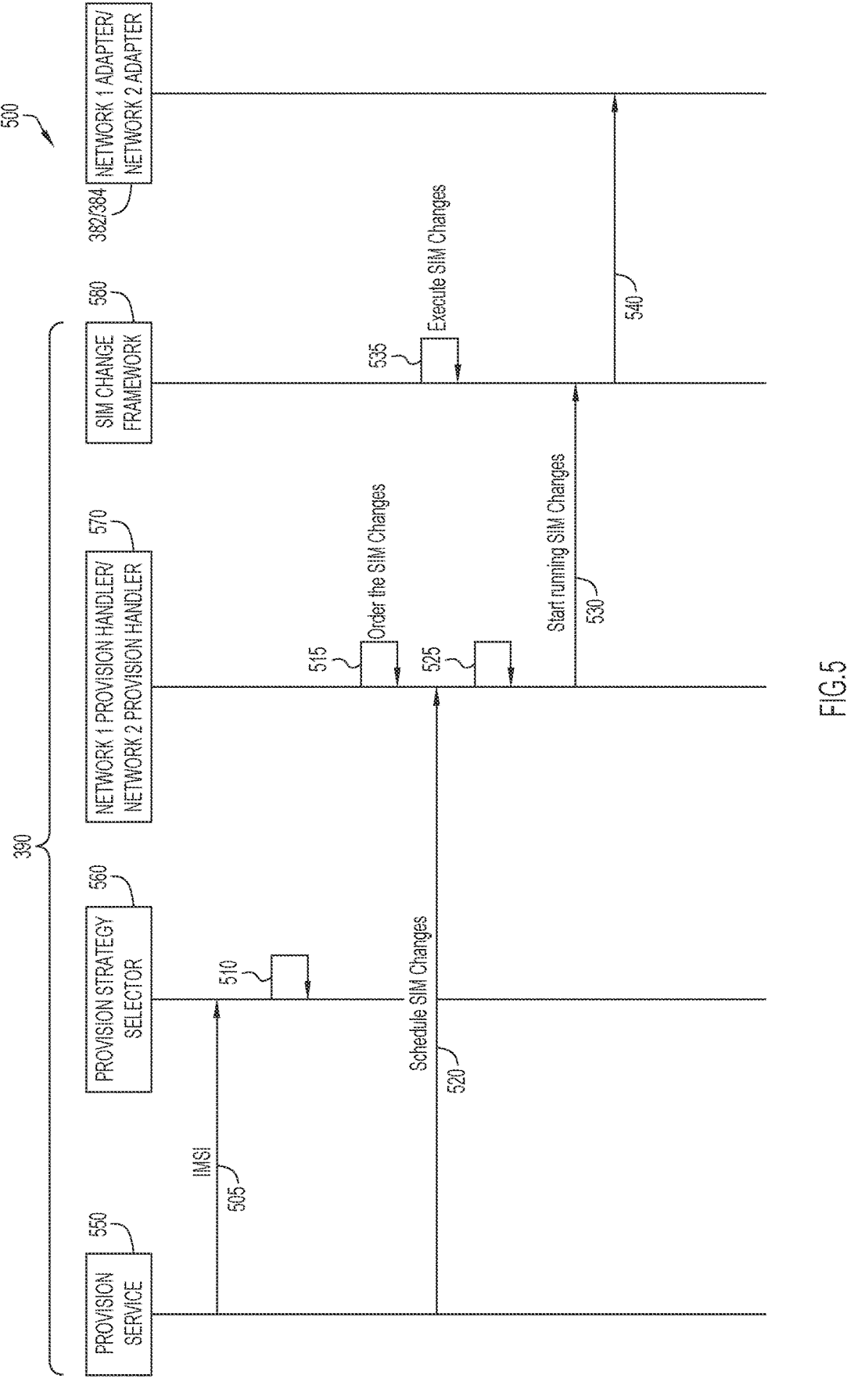
FIG. 5 illustrates a flow diagram of a method for provisioning a device among a plurality of networks from a device management platform instance, according to an example embodiment.

With continued reference to FIGS. 1-4, FIG. 5 illustrates a flow diagram of a method 500 for provisioning a device among a plurality of networks from a device management platform instance, according to an example embodiment. By way of example, FIG. 5 is described with respect to service providers (SPs) and enterprises. However, the embodiments may be utilized with respect to any other entities, any type of information from networks, and any type of actions.

Initially, provisioning module 390 of device management platform 150 includes a provision service 550, a provision strategy selector 560, provision handlers 570, and a subscriber identity module (SIM) framework 580. Provision service 550 initiates provisioning based on an international mobile subscriber identity (IMSI). Provision strategy selector 560 determines a plan or strategy to implement the provisioning, while provision handlers 570 manage actions to perform the provisioning. SIM change framework 580 implements SIM changes for the provisioning.

A request is received by device management platform 150 and provided to provision service 550. The request may be received from a user interface or application programming interface (API). The request may be made from, or provided to, an instance or account of the device management platform for a service provider or other entity. For example, the service provider or other entity may provide a request to provision a device on one of a plurality of different networks integrated with the instance or account. The instance or account on the device management platform maintains a list of devices associated with the account (and service provider or other entity) and corresponding device information.

The request includes an identifier for a corresponding device (e.g., international mobile subscriber identity (IMSI), etc.) and an action to be performed on a network for the corresponding device (e.g., activation of the device on a network, deactivation of the device on a network, update a profile for the device, etc.). The device may be associated with a new subscriber identity module (SIM) to be provisioned (e.g., activated, etc.) on a network (e.g., from a manufacturer, etc.), or to an existing SIM for updates for the device on the network (e.g., activate, deactivate, update a profile (e.g., services, plans, etc.), etc.).

Provision service 550 requests provision strategy selector 560 to determine a provision plan or strategy based on the international mobile subscriber identity (IMSI) at operation

505. The provision strategy selector determines the core identifier from the prefix of the IMSI, and queries database 375 based on the core identifier to retrieve an indication of a core network for the device in substantially the same manner described above. The core network indication may include any indication or identifier indicating the core network (e.g., name, code, network identifier, network identification, network address, etc.).

Provision strategy selector 560 determines a provisioning plan or strategy to perform the requested provisioning at operation 510 based on the core network indication. The provisioning plan may include the type of provisioning, the operations to be performed (e.g., subscriber identity module (SIM) changes, etc.), and/or the core network. The database may store a series of provisioning plans that are associated with corresponding core networks. A provisioning plan is selected from among the stored plans based on the core network indicated for the device.

Provision handlers 570 may include provision handlers corresponding to different networks (e.g., Network 1 Provision Handler and Network 2 Provision Handler as viewed in FIG. 5), and the provision handler corresponding to the indicated core network configures and orders operations (or subscriber identity module (SIM) changes) for the provisioning at operation 515. For example, various SIM change objects (e.g., for a state change, profile change, MSISDN change, etc.) may be created with knowledge or information for the provisioning (e.g., services, plans, SIM parameters, etc.).

Provision service 550 further schedules the operations (or subscriber identity module (SIM) changes) at operation 520. The corresponding provision handler monitors the schedule at operation 525 and requests SIM change framework 580 to implement the SIM changes according to the schedule at operation 530. SIM change framework 580 executes the SIM changes according to the information of the SIM change objects at operation 535, and requests a network adapter 382, 384 corresponding to the indicated core network (e.g., Network 1 Adapter and Network 2 Adapter as viewed in FIG. 5) to have the provisioning performed on the indicated core network at operation 540 (e.g., activate or add a subscriber or device, update a subscriber or device (e.g., services, plans, etc.), deactivate or delete a subscriber or device, etc.). The network adapter provides the request to the indicated core network (or network element), and receives a result (e.g., success or failure, etc.) of the provisioning.

In addition, once a new device has been provisioned on the core network or an existing device updated, device management platform 150 monitors and tracks usage of the device based on the core identifier. For example, the core identifier (and a device identifier) are used within network or other data traffic. This enables the device management platform to identify the network and device in order to steer the data traffic to a network, or process the data traffic for the device. The device may be mapped to a device management platform instance or account, where the device management platform may process data for the device for presentation via the instance or account. By way of example, the instance or account of the device management platform may provide real-time troubleshooting of the device, live device tracking, charging data records (CDRs), centralized monitoring, billing, and rating, etc. This enables a service provider or other entity to monitor and track usage of their devices across different networks from a single instance or account of the device management platform.

FIG. 6 is a flowchart of an example method 600 for integrating different networks into a device management platform instance, according to an example embodiment. At operation 605, one or more processors of a device management platform map network identifiers to corresponding networks. An account of the device management platform manages devices on a plurality of networks based on the network identifiers. At operation 610, the one or more processors of the device management platform identify a network of a device associated with the account from the plurality of networks based on a mapping of a network identifier of the device to the network. At operation 615, the one or more processors of the device management platform perform an action for the device with respect to the network.

Figure 7:
FIG. 7 illustrates a hardware block diagram of a computing device configured to perform functions associated with operations discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any device entity/ entities (e.g., computer devices, server systems, user devices, device management platform and components thereof, systems of the service providers (SPs) and/or enterprises, etc.) as discussed for the techniques depicted in connection with FIGS. 1-6 in order to perform operations of the various techniques discussed herein.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/ modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, network device, user device, etc.), computing device 700 may further include, or be coupled to, a speaker 722 to convey sound, microphone or other sound sensing device 724, camera or image capture device 726, a keypad or keyboard 728 to enter information (e.g., alphanumeric information, etc.), and/or a touch screen or other display 730. These items may be coupled to bus 708 or I/O interface(s) 714 to transfer data with other elements of computing device 700.

In various embodiments, control logic 720 can include instructions that, when executed, cause processor(s) 702 to perform operations, which can include, but not be limited to, providing overall control operations of computing device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, device management platform 150 may monitor devices in real-time, thereby enabling detection of anomalies and reporting of data as events occur. For example, the device management platform instances may utilize the usage data to detect anomalies or abnormal device operation on different networks. When an anomaly is detected for a device, the device management platform instance may perform various actions to remediate the anomaly in device operation (e.g., send notifications to the service providers and/or enterprises, disable the device, disable connectivity of the device or remove the device from the network, etc.).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly be connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: mapping, by one or more processors of a device management platform, network identifiers to corresponding networks, wherein an account of the device management platform manages devices on a plurality of networks based on the network identifiers; identifying, by the one or more processors of the device management platform, a network of a device associated with the account from the plurality of networks based on a mapping of a network identifier of the device to the network; and performing, by the one or more processors of the device management platform, an action for the device with respect to the network.

In one example, performing the action comprises provisioning the device on the network, wherein the provisioning comprises one or more from a group of activating the device on the network, deactivating the device on the network, and updating a profile.

In one example, the network identifier is based on an IMSI.

In one example, the network identifier includes one or more from a group of a device ID and an IP address range.

In one example, performing the action comprises one or more from a group of: controlling billing for the device on the network based on charging data records for the device; and controlling network feeds on the network.

In one example, performing the action comprises troubleshooting the device on the network.

In one example, the method further comprises providing, by the one or more processors of the device management platform, a single interface to manage the devices associated with the account on the plurality of networks.

In another form, an apparatus is provided. The apparatus comprises a device management platform comprising one or more processors configured to: map network identifiers to corresponding networks, wherein an account of the device management platform manages devices on a plurality of networks based on the network identifiers; identify a network of a device associated with the account from the plurality of networks based on a mapping of a network identifier of the device to the network; and perform an action for the device with respect to the network.

In another form, one or more non-transitory computer readable storage media are provided. The non-transitory computer readable storage media are encoded with processing instructions that, when executed by one or more processors of a device management platform, cause the one or more processors to: map network identifiers to corresponding networks, wherein an account of the device management platform manages devices on a plurality of networks based on the network identifiers; identify a network of a device associated with the account from the plurality of networks based on a mapping of a network identifier of the device to the network; and perform an action for the device with respect to the network.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:

mapping, by one or more processors of a device management platform, network identifiers to corresponding networks that distinguish between the corresponding networks, wherein an account of the device management platform for an entity manages devices of the entity on a plurality of different networks based on the network identifiers;

receiving, by the one or more processors of the device management platform, a request for a device associated with the account, wherein the request includes a device identifier;

determining, by the one or more processors of the device management platform, a network identifier for the device from a portion of the device identifier;

identifying, by the one or more processors of the device management platform, a network of the device from the plurality of different networks based on a mapping of the network identifier of the device to the network;

performing, by the one or more processors of the device management platform, an action for the device with respect to the network; and tracking, by the one or more processors of the device management platform, usage of the devices of the entity on the plurality of different networks from the account based on the network identifiers within data traffic associated with the devices.

2. The method of claim 1, wherein performing the action comprises:

provisioning the device on the network, wherein the provisioning comprises one or more from a group of activating the device on the network, deactivating the device on the network, and updating a profile.

3. The method of claim 1, wherein the network identifier is based on an IMSI.

4. The method of claim 3, wherein the network identifier further includes an IP address range.

5. The method of claim 1, wherein performing the action comprises one or more from a group of:

controlling billing for the device on the network based on charging data records for the device; and controlling network feeds on the network.

6. The method of claim 1, wherein performing the action comprises:

troubleshooting the device on the network.

7. The method of claim 1, further comprising:

providing, by the one or more processors of the device management platform, a single interface to manage the devices associated with the account on the plurality of different networks.

8. An apparatus comprising:

a device management platform comprising one or more processors configured to perform operations including:

mapping network identifiers to corresponding networks that distinguish between the corresponding networks, wherein an account of the device management platform for an entity manages devices of the entity on a plurality of different networks based on the network identifiers;

receiving a request for a device associated with the account, wherein the request includes a device identifier;

determining a network identifier for the device from a portion of the device identifier;

identifying a network of the device from the plurality of different networks based on a mapping of the network identifier of the device to the network;

performing an action for the device with respect to the network; and tracking usage of the devices of the entity on the plurality of different networks from the account based on the network identifiers within data traffic associated with the devices.

9. The apparatus of claim 8, wherein performing the action comprises:

provisioning the device on the network, wherein the provisioning comprises one or more from a group of activating the device on the network, deactivating the device on the network, and updating a profile.

10. The apparatus of claim 8, wherein the network identifier is based on an IMSI.

11. The apparatus of claim 10, wherein the network identifier further includes an IP address range.

12. The apparatus of claim 8, wherein performing the action comprises one or more from a group of:

controlling billing for the device on the network based on charging data records for the device;

controlling network feeds on the network; and troubleshooting the device on the network.

13. The apparatus of claim 8, wherein the one or more processors of the device management platform are configured to perform further operations including:

providing a single interface to manage the devices associated with the account on the plurality of different networks.

14. One or more non-transitory computer readable storage media encoded with processing instructions, that when executed by one or more processors of a device management platform, cause the one or more processors to perform operations including:

mapping network identifiers to corresponding networks that distinguish between the corresponding networks, wherein an account of the device management platform for an entity manages devices of the entity on a plurality of different networks based on the network identifiers;

receiving a request for a device associated with the account, wherein the request includes a device identifier;

determining a network identifier for the device from a portion of the device identifier;

identifying a network of the device from the plurality of different networks based on a mapping of the network identifier of the device to the network;

performing an action for the device with respect to the network; and tracking usage of the devices of the entity on the plurality of different networks from the account based on the network identifiers within data traffic associated with the devices.

15. The one or more non-transitory computer readable storage media of claim 14, wherein performing the action comprises:

provisioning the device on the network, wherein the provisioning comprises one or more from a group of activating the device on the network, deactivating the device on the network, and updating a profile.

16. The one or more non-transitory computer readable storage media of claim 14, wherein the network identifier is based on an IMSI.

17. The one or more non-transitory computer readable storage media of claim 16, wherein the network identifier further includes an IP address range.

18. The one or more non-transitory computer readable storage media of claim 14, wherein performing the action comprises one or more from a group of:

controlling billing for the device on the network based on charging data records for the device; and controlling network feeds on the network.

19. The one or more non-transitory computer readable storage media of claim 14, wherein performing the action comprises:

troubleshooting the device on the network.

20. The one or more non-transitory computer readable storage media of claim 14, wherein the processing instructions cause the one or more processors to perform further operations including:

providing a single interface to manage the devices associated with the account on the plurality of different networks.

* * * * *